United States Patent
Sharma et al.

(10) Patent No.: US 9,661,530 B2
(45) Date of Patent: May 23, 2017

(54) DATA TRAFFIC BEARER SELECTION BASED ON BACKHAUL STATISTICS

(71) Applicant: Apple Inc., Cupertino, CA (US)

(72) Inventors: Pradeep S. Sharma, Cupertino, CA (US); Ajoy K. Singh, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 5 days.

(21) Appl. No.: 14/568,982

(22) Filed: Dec. 12, 2014

(65) Prior Publication Data
US 2016/0174110 A1    Jun. 16, 2016

(51) Int. Cl.
| | |
|---|---|
| H04W 36/22 | (2009.01) |
| H04L 12/801 | (2013.01) |
| H04M 1/00 | (2006.01) |
| H04W 36/00 | (2009.01) |
| H04W 76/02 | (2009.01) |
| H04L 12/26 | (2006.01) |
| H04W 28/08 | (2009.01) |
| H04W 72/08 | (2009.01) |
| H04W 84/04 | (2009.01) |

(Continued)

(52) U.S. Cl.
CPC ..... H04W 36/0022 (2013.01); H04L 43/0864 (2013.01); H04W 28/08 (2013.01); H04W 76/025 (2013.01); H04W 72/087 (2013.01); H04W 84/042 (2013.01); H04W 84/12 (2013.01); H04W 88/06 (2013.01)

(58) Field of Classification Search
CPC ........... H04W 36/0022; H04W 76/025; H04W 72/087; H04W 84/042; H04W 88/06; H04W 28/08; H04W 84/12; H04L 43/0864; H04L 69/14; H04M 1/72561

USPC ......................................................... 370/331
See application file for complete search history.

(56) References Cited

U.S. PATENT DOCUMENTS

| | | | |
|---|---|---|---|
| 2004/0148423 A1* | 7/2004 | Key ........................ | H04L 47/10 709/235 |
| 2008/0096560 A1* | 4/2008 | Felske ............... | H04W 36/0083 455/436 |

(Continued)

FOREIGN PATENT DOCUMENTS

WO    2013142361    9/2013

OTHER PUBLICATIONS

A 3G/LTE VVi-Fi Offload Framework: Connectivity Engine (CnE) to Manage Inter-System Radio Connections and Appiications, Qualcomm Incorporated Jun. 2011, 15 pages.*

(Continued)

*Primary Examiner* — Edan Orgad
*Assistant Examiner* — Vanneilian Lalchinthang
(74) *Attorney, Agent, or Firm* — Meyertons Hood Kivlin Kowert & Goetzel, P.C.; Jeffrey C. Hood; Joel L. Stevens

(57) ABSTRACT

An apparatus, system, and method for selecting a connection for a real time application. In one embodiment, a mobile device may communicate with a cellular network over a cellular connection and a WiFi network over a WiFi connection. The mobile device may determine backhaul data of the WiFi connection. The mobile device may generate a plurality of statistics from the backhaul data to generate backhaul statistics. Based on the plurality of statistics passing one or more thresholds, the mobile device may select the WiFi connection for use in a real-time application of the mobile device.

20 Claims, 5 Drawing Sheets

(51) Int. Cl.
*H04W 84/12* (2009.01)
*H04W 88/06* (2009.01)

(56) References Cited

U.S. PATENT DOCUMENTS

| | | | | |
|---|---|---|---|---|
| 2009/0124284 | A1* | 5/2009 | Scherzer | H04M 1/72561 455/552.1 |
| 2009/0227251 | A1* | 9/2009 | Lei | H04J 11/0069 455/425 |
| 2012/0003976 | A1* | 1/2012 | Bhat | H04W 48/18 455/436 |
| 2013/0021933 | A1 | 1/2013 | Kovvali et al. | |
| 2013/0326010 | A1* | 12/2013 | Singh | H04L 43/06 709/217 |
| 2014/0241183 | A1* | 8/2014 | Comeau | H04L 5/0098 370/252 |
| 2014/0334306 | A1* | 11/2014 | Yang | H04L 47/12 370/235 |
| 2015/0045032 | A1* | 2/2015 | Tomici | H04W 36/04 455/436 |
| 2015/0163708 | A1* | 6/2015 | Kunugi | H04W 36/0066 455/437 |
| 2015/0172986 | A1* | 6/2015 | Salkintzis | H04W 36/22 455/436 |
| 2015/0215184 | A1* | 7/2015 | Sundararajan | H04L 43/0811 370/252 |

OTHER PUBLICATIONS

"A 3G/LTE Wi-Fi Offload Framework: Connectivity Engine (CnE) to Manage Inter-System Radio Connections and Applications", Jun. 2011, 15 pages, QUALCOMM, Incorporated, United States.

* cited by examiner

DATA TRAFFIC BEARER SELECTION BASED ON BACKHAUL STATISTICS

FIELD

The present application relates to wireless communication systems, and more particularly to an apparatus, system, and method for data traffic bearer selection based on backhaul statistics.

DESCRIPTION OF THE RELATED ART

Wireless communication systems are rapidly growing in usage. Further, wireless communication technology has evolved from voice-only communications to also include the transmission of data, such as Internet and multimedia content.

Expanding traffic on mobile networks has increased the need for mobile data offloading, wherein a mobile device may access carrier provided services originally targeted for cellular networks over an alternative wireless network, such as Wi-Fi (WLAN). One form of mobile data offloading uses I-WLAN (Interworking Wireless LAN) or SMOG (S2b Mobility based on GTP (GPRS Tunneling protocol)) architecture to supply carrier-provided services to the mobile device over Wi-Fi. These carrier-provided services may include VVM (Visual VoiceMail), MMS (Multimedia Messaging Service), SMS (Short Messaging Service) and IMS (IP Multimedia Subsystem).

In such situations, the mobile device has the capability of using multiple data bearers for various functions, e.g., including calls. Improvements in data bearer selection are therefore desired.

SUMMARY

Embodiments described herein relate to an apparatus, system, and method data traffic bearer selection based on backhaul statistics.

In one embodiment, a method may include a mobile device communicating with a cellular network over a cellular connection and a WiFi network over a WiFi connection. The method may further include the mobile device determining backhaul data of the WiFi connection. The method may further include the mobile device may generating a plurality of statistics from the backhaul (or end-to-end) data to generate backhaul statistics. Based on the plurality of statistics passing one or more thresholds, the mobile device may select the WiFi connection for use in a real-time application of the mobile device.

A mobile device may include at least one antenna. The mobile device may include a first radio that is configured to perform cellular communication with a cellular base station using at least one cellular radio access technology (RAT). The mobile device may include a second radio that is configured to perform Wi-Fi communication with a Wi-Fi access point. The mobile device may include at least one processor coupled to the first and second radios. The mobile device may be configured to perform voice and/or data communications by communicate with the cellular base station over a cellular connection and/or communicating with the WiFi access point over a WiFi connection. The mobile device may periodically determine backhaul (or end-to-end) data of the WiFi connection. The mobile device may generate a plurality of statistics from a plurality of end-to-end or backhaul data over at least two periods to generate backhaul statistics. Based on the plurality of statistics passing one or more thresholds, the mobile device may select one of the WiFi connection and the cellular connection for performing a voice call.

A non-transitory, computer accessible memory medium may store program instructions for selecting a connection for a real time application. The program instructions may be executable by a processor of a mobile device to communicate with a cellular network over a cellular connection and a WiFi network over a WiFi connection. The program instructions may be further executable to generate a plurality of statistics based on backhaul data of the WiFi connection to generate backhaul statistics. The program instructions may be further executable to, based on the plurality of statistics passing one or more thresholds, select the WiFi connection for use in a voice call of the mobile device.

The techniques described herein may be implemented in and/or used with a number of different types of devices, including but not limited to cellular base stations, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
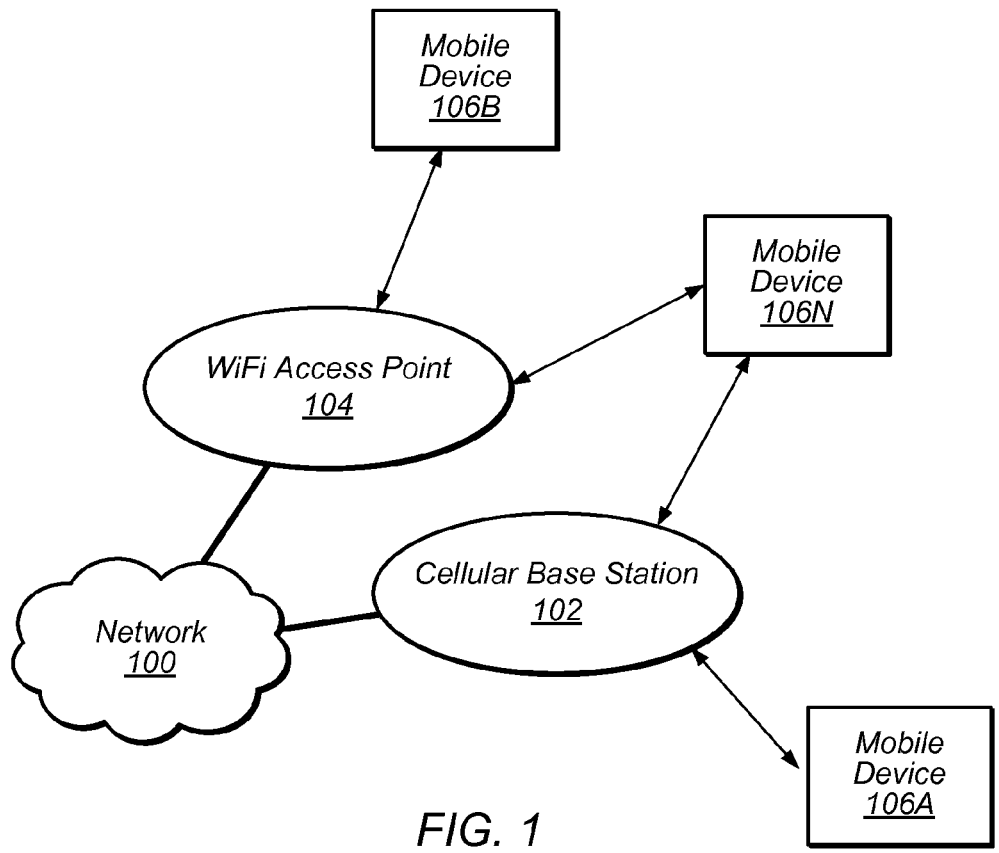
FIG. 1 illustrates an example (and simplified) wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

BS: Base Station
AP: Access Point
APN: Access Point Name
LTE: Long Term Evolution
VoLTE: Voice over LTE
VOIP: Voice Over IP
IMS: IP Multimedia Subsystem
MO: Mobile Originated
MT: Mobile Terminated
RAT: Radio Access Technology
TX: Transmit
RX: Receive
WLAN: Wireless Local Area Network
I-WLAN: Interworking WLAN
SIP: Session Initiation Protocol
PDN: Packet Data Network
PGW: PDN Gateway
SGW: Signaling Gateway
P-CSCF: Proxy Call Session Control Function
ePDG: evolved Packet Data Gateway
IFOM: IP Flow Mobility
SMOG: S2b Mobility based on GTP
GTP: GPRS Tunneling Protocol
GPRS: General Packet Radio Service

GLOSSARY

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Mobile Device—any of various types of communication devices which are mobile and are capable of communicating on a cellular network and a non-cellular network, such as Wi-Fi. A UE is an example of a mobile device.

Base Station—The term "Base Station" has the full breadth of its ordinary meaning, and at least includes a wireless communication station installed at a fixed location and used to communicate as part of a wireless cellular telephone system or cellular radio system.

Access Point—The term "Access Point" has the full breadth of its ordinary meaning, and at least includes a wireless communication device which offers connectivity to a wireless local area network (WLAN), such as a Wi-Fi network.

Wi-Fi—The term "Wi-Fi" has the full breadth of its ordinary meaning, and at least includes a wireless local area network technology based on the IEEE (Institute of Electrical and Electronics Engineers) 802.11 standards, and future revisions or enhancements to those standards.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
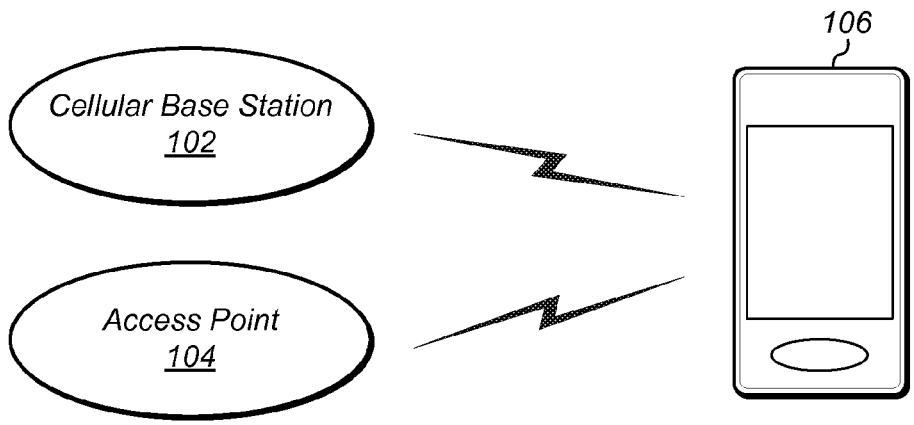
FIG. 2 illustrates a mobile device in communication with a cellular base station and an access point (AP)

FIGS. 1 and 2—Communication System

FIG. 1 illustrates an exemplary (and simplified) wireless communication system. It is noted that the system of FIG. 1 is merely one example of a possible system, and embodiments of the invention may be implemented in any of various systems, as desired.

As shown, the example wireless communication system includes a cellular base station 102 which may communicate over a transmission medium with one or more mobile devices 106A, 106B, etc., through 106N. Each of the mobile devices may be, for example, a "user equipment" (UE) or other types of devices as defined above.

The base station 102 may be a base transceiver station (BTS) or cell site, and may include hardware that enables wireless cellular communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the mobile devices and/or between the mobile devices and the network 100.

The communication area (or coverage area) of the base station may be referred to as a "cell." The base station 102 and the UEs 106 may be configured to communicate over the transmission medium using any of various cellular radio access technologies (RATs), also referred to as wireless cellular communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc. A typical wireless cellular communication system will include a plurality of cellular base stations which provide different coverage areas or cells, with handoffs between cells.

Additionally, the example wireless communication system may include one or more wireless access points (such as access point 104) which may be communicatively coupled to the network 100. Each wireless access point 104 may provide a wireless local area network (WLAN) for communication with mobile devices 106. These wireless access points may comprise Wi-Fi access points. Wireless access point 104 may be configured to support cellular network offloading and/or otherwise provide wireless communication services as part of the wireless communication system illustrated in FIG. 1.

1) Cellular base station 102 and other similar base stations and 2) access points (such as access point 104) operating according to a different wireless communication standard may thus be provided as a network which may provide continuous or nearly continuous overlapping service to mobile devices 106 and similar devices over a wide geographic area via one or more wireless communication standards.

Thus, while base station 102 may act as a "serving cell" for a UE 106 as illustrated in FIG. 1, each mobile device 106 may also be capable of receiving signals from (and possibly within communication range of) one or more other cells (which might be provided by other base stations (not shown) and/or wireless local area network (WLAN) access points, which may be referred to as "neighboring cells" or "neighboring WLANs" (e.g., as appropriate), and/or more generally as "neighbors".

FIG. 2 illustrates mobile device 106 (e.g., one of the devices 106A through 106N) in communication with both a Wi-Fi access point 104 and a cellular base station 102. The mobile device 106 may be a device with both cellular communication capability and non-cellular communication capability, e.g., Wi-Fi capability, such as a mobile phone, a hand-held device, a computer or a tablet, or virtually any type of wireless device.

The mobile device 106 may include a processor that is configured to execute program instructions stored in memory. The mobile device 106 may perform any of the method embodiments described herein by executing such stored instructions. Alternatively, or in addition, the mobile device 106 may include a programmable hardware element such as an FPGA (field-programmable gate array) that is configured to perform any of the method embodiments described herein, or any portion of any of the method embodiments described herein.

In some embodiments, the mobile device 106 may be configured to communicate using any of multiple radio access technologies/wireless communication protocols. For example, the mobile device 106 may be configured to communicate using any of various cellular communication technologies, such as GSM, UMTS, CDMA2000, LTE, LTE-A, etc. The mobile device may also be configured to communicate using any of various non-cellular communication technologies such as WLAN/Wi-Fi, or GNSS. Other combinations of wireless communication technologies are also possible.

The mobile device 106 may include one or more antennas for communicating using one or more wireless communication protocols or technologies. In one embodiment, the mobile device 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the mobile device 106 may share one or more parts of a receive and/or transmit chain between multiple wireless communication technologies, such as those discussed above.

In some embodiments, the mobile device 106 may include separate transmit and/or receive chains (e.g., including separate RF and/or digital radio components) for each wireless communication protocol with which it is configured to communicate. As a further possibility, the mobile device 106 may include one or more radios which are shared between multiple wireless communication protocols, and one or more radios which are used exclusively by a single wireless communication protocol. For example, the mobile device 106 might include a shared radio for communicating using either of LTE or 1×RTT (or LTE or GSM), and separate radios for communicating using each of Wi-Fi and Bluetooth. Other configurations are also possible.

Figure 3:
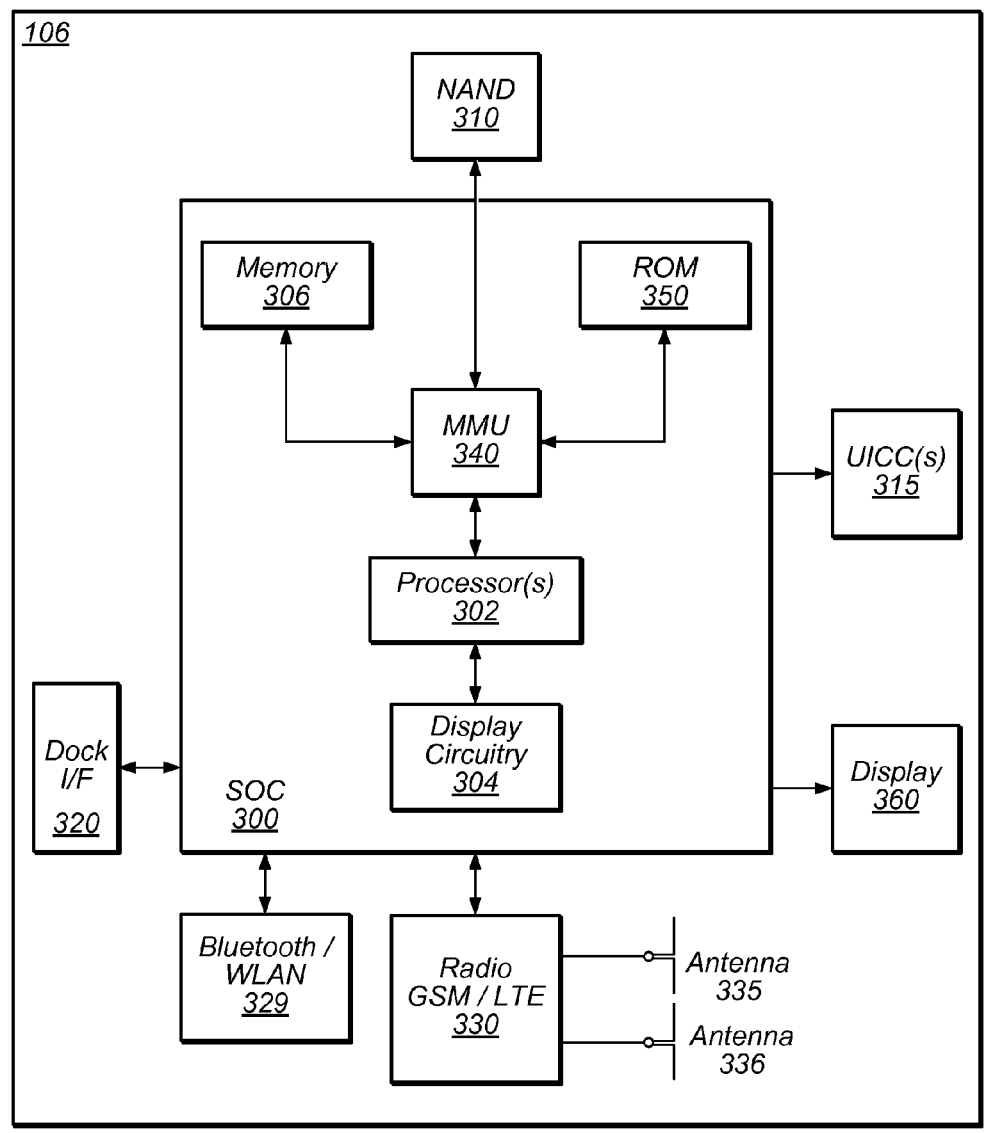
FIG. 3 illustrates an example block diagram of a mobile device.

FIG. 3—Mobile Device Block Diagram

FIG. 3 illustrates an example simplified block diagram of a mobile device 106. As shown, the mobile device 106 may include a system on chip (SOC) 300, which may include portions for various purposes. The SOC 300 may be coupled to various other circuits of the mobile device 106. For example, the mobile device 106 may include various types of memory (e.g., including NAND flash 310), a connector interface 320 (e.g., for coupling to a computer system, dock, charging station, etc.), the display 360, cellular communication circuitry 330 such as for LTE, GSM, etc., and short range wireless communication circuitry 329 (e.g., Bluetooth™ and WLAN circuitry). The mobile device 106 may further comprise one or more smart cards 315 that comprise SIM (Subscriber Identity Module) functionality, such as one or more UICC(s) (Universal Integrated Circuit Card(s)) cards 315. The cellular communication circuitry 330 may couple to one or more antennas, preferably two antennas 335 and 336 as shown. The short range wireless communication circuitry 429 may also couple to one or both of the antennas 335 and 336 (this connectivity is not shown for ease of illustration).

As shown, the SOC 300 may include processor(s) 302 which may execute program instructions for the mobile device 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector I/F 320, and/or display 360. The MMU 340 may be configured to perform memory protection and page table translation or set up. In some embodiments, the MMU 340 may be included as a portion of the processor(s) 302.

In one embodiment, as noted above, the mobile device 106 comprises at least one smart card 315, such as a UICC 315, which executes one or more Subscriber Identity Module (SIM) applications and/or otherwise implement SIM functionality. The at least one smart card 315 may be only a single smart card 315, or the mobile device 106 may comprise two or more smart cards 315. Each smart card 315 may be embedded, e.g., may be soldered onto a circuit board in the mobile device 106, or each smart card 3105 may be implemented as a removable smart card, an electronic SIM (eSIM) or any combination thereof. Any of various other SIM configurations are also contemplated.

As noted above, the mobile device 106 may be configured to communicate wirelessly using multiple radio access technologies (RATs). The mobile device 106 may be configured to communicate according to a WIFI RAT and/or one or more cellular RATs, e.g., such as communicating on both WIFI and cellular at the same time. For example, the mobile device 106 may be communicating on a primary communication channel (such as WIFI), and in response to detected degradation of the primary communication channel may establish a secondary communication channel (such as on cellular). The mobile device 106 may operate to dynamically establish and/or remove different primary and/or secondary communication channels as needed, e.g., to provide the best user experience while attempting to minimize cost.

As described herein, the mobile device 106 may include hardware and software components for implementing the features and methods described herein. The processor 302 of the mobile device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the mobile device 106, in conjunction with one or more of the other components 300, 304, 306, 310, 320, 330, 335, 340, 350, 360 may be configured to implement part or all of the features described herein.

Figure 4:
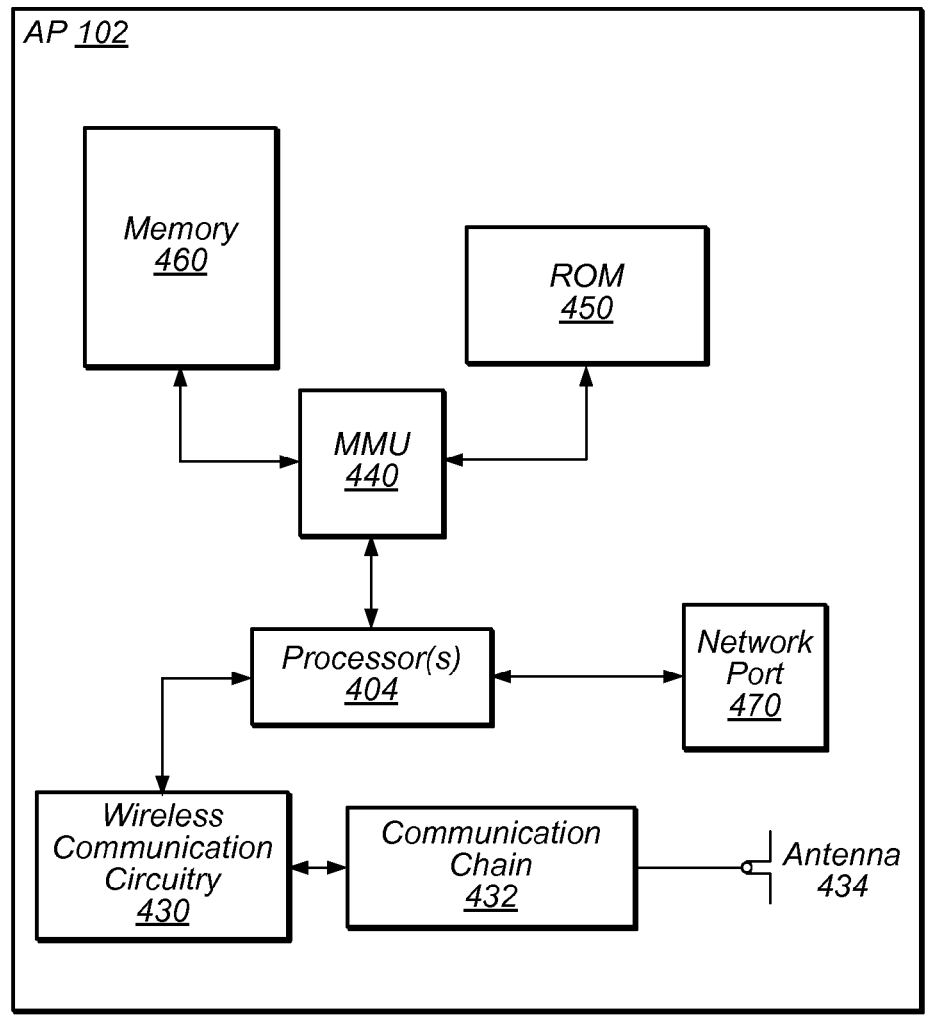
FIG. 4 illustrates an example block diagram of an access point.

FIG. 4—Exemplary Block Diagram of an Access Point

FIG. 4 illustrates an example block diagram of an access point 104. It is noted that the access point 104 of FIG. 4 is merely one example of a possible access point. As shown, the access point 104 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The access point 104 may include at least one network port 470. The network port 470 may be configured to couple to a network, such as the Internet, and provide a plurality of devices, such as mobile devices 106, access to the network as described above in FIGS. 1 and 2.

The network port 470 (or an additional network port) may also be configured to couple to a cellular network, e.g., a core network of a cellular service provider. The core network may provide mobility related services and/or other services to a plurality of devices, such as mobile devices 106. In some cases, the network port 470 may couple to a telephone network via the core network, and/or the core network may provide a telephone network (e.g., among other mobile devices serviced by the cellular service provider).

The access point 104 may include at least one antenna 434, and possibly multiple antennas. The at least one antenna 434 may be configured to operate as a wireless transceiver and may be further configured to communicate with mobile devices 106 via radio 430. The antenna 434 communicates with the wireless communication circuitry 430 via communication chain 432. Communication chain 432 may be a receive chain, a transmit chain or both. The radio 430 may be configured to communicate via various wireless local area network standards, including, but not limited to Wi-Fi.

The block diagram of FIG. 4 may also apply to cellular base station 102, except that communication may be performed using any of various cellular communication technologies.

FIG. 5

Figure 5:
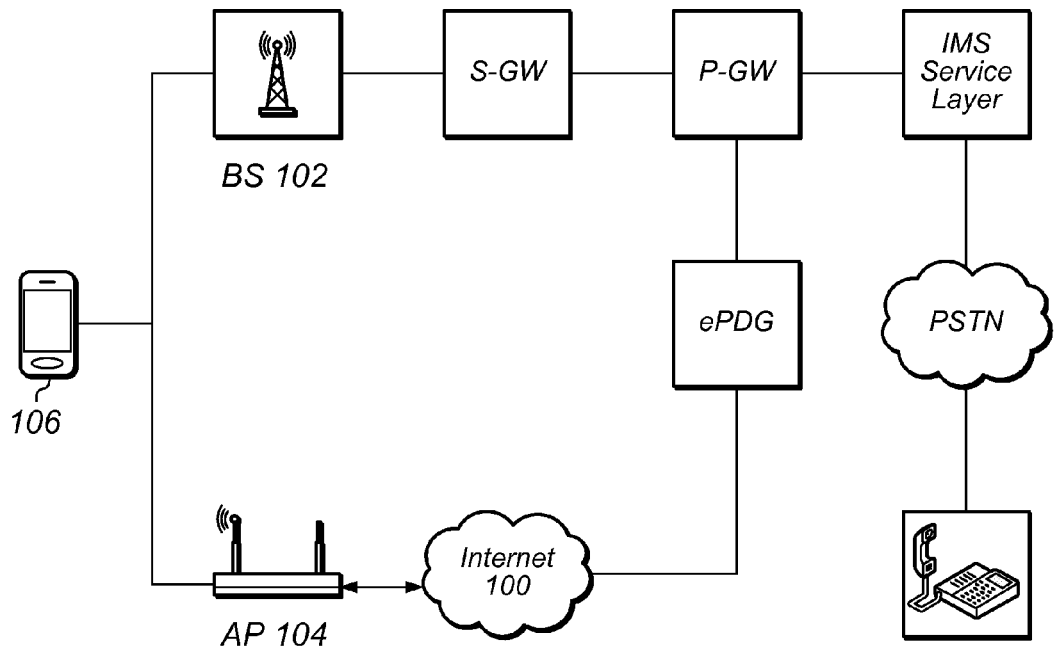
FIG. 5 is a block diagram of an example communication system.

FIG. 5 illustrates an example wireless communication system according to one embodiment. As shown, the mobile device 106 may communicate with a cellular network via cellular base station 102. The cellular base station 102 may communicate with a Serving Gateway (SGW). The SGW is responsible for handovers with neighboring base stations. The SGW couples to a Packet Data Network (PDN) Gateway, or (PGW). The PGW operates to interface between the cellular and WiFi networks. Together the SGW and the PGW make up the evolved packet core (EPC).

As shown, mobile device 106 may also communicate with an access point 104, which in this embodiment may be a WiFi access point presenting a WiFi network. The Wi-Fi access point 104 may couple through a network, such as the Internet, to an evolved Packet Data Gateway (ePDG). The ePDG is utilized in the network function of 4G mobile core networks, known as the evolved packet core (EPC) mentioned above, as well as future mobile networks, such as 5G networks. The ePDG may act as an interface between the EPC and non-3GPP networks that may use secure access, such as Wi-Fi and femtocell access networks.

The PGW may couple to an IMS (IP Multimedia Subsystem) server. The IMS server may comprise a computer system with a processor and memory which performs various operations as described herein. The IMS server may implement an IMS Service Layer. The IMS server may also implement a Proxy Call Session Control Function (P-CSCF). The P-CSCF may act as the entry point to the IMS domain and may serve as the outbound proxy server for the mobile device. The mobile device may attach to the P-CSCF prior to performing IMS registrations and initiating SIP sessions. The P-CSCF may be in the home domain of the IMS operator, or it may be in the visiting domain where the mobile device is currently roaming.

The IMS server may couple to other networks such as the public switched telephone network (PSTN) or other types of communication networks, e.g., for communicating with other communication devices, such as a standard POTS telephone (shown), another mobile device, etc.

FIG. 6

Figure 6:
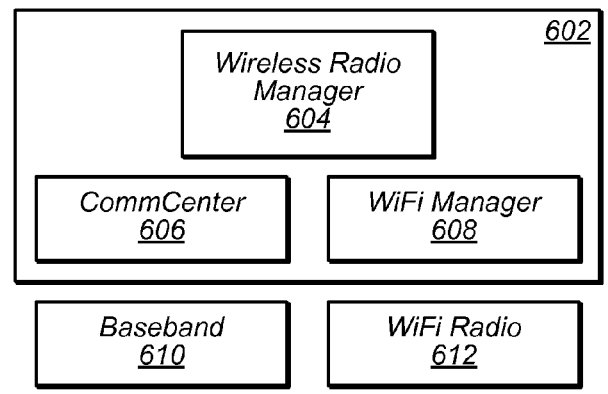
FIG. 6 illustrates various WLAN communication components present in the mobile device.

FIG. 6 illustrates example functionality that may be present in the mobile device 106. As shown, the mobile device 106 may comprise a RAT block 602 that comprises a wireless radio manager 604, a communication center (CommCenter) block 606, and a WiFi manager block 608. The wireless radio manager 604 may be configured to receive various statistics from the communication center block 606 and/or the WiFi manager block 608 and determine whether to use one or more of available cellular and WiFi connections based on the statistics. In particular, as discussed below, in one embodiment, the wireless radio manager 604 may be configured to determine whether a WiFi connection should be IMS registered and/or whether an active call should be handed over from WiFi to cellular or from cellular to WiFi.

In one embodiment, the communication block 606 may manage or control baseband logic 610 (e.g., related to cellular communication) and WiFi manager block 608 may manage or control WiFi radio 612. Although not shown, the RAT block 602 may include a symptoms manager that may report current connection information (e.g., connection metrics or statistics) to the wireless radio manager 604. Elements of the RAT block 602 may be implemented as software or firmware executable by a processor.

Data Bearer Selection

In some embodiments, the mobile device, e.g., the wireless radio manager 604 of the mobile device 106 may operate to determine whether to use a WiFi connection or cellular (e.g., LTE) connection for a call, e.g., while in idle mode. With WiFi calling (e.g., carrier WiFi calling), a user may be allowed to make a WiFi call (e.g., when the user has the proper subscription) while on WiFi access points (e.g., even including untrusted WiFi access points such as those found at coffee shops, airports, corporate locations, and in residences). Because of the numerous available access points, it may be important to actively monitor their connection statistics (e.g., backhaul or TCP statistics) to determine whether to retain or change a current WiFi network or connection as a data bearer for a real time application, such as a phone call, video call, etc. Since the carrier network may provide sufficient fallback to voice over LTE (e.g., for a voice call) which has the necessary quality of service (QoS), WiFi calling may only be selected when the WiFi connection is able to meet a threshold level of QoS.

Accordingly, in one embodiment, the mobile device may monitor metrics of the WiFi connection (e.g., from a networking stack of the mobile device). In one embodiment, these metrics may be received or measured periodically, e.g., every 5 seconds while device is in idle mode, based on background traffic and services. For example, these metrics may be generated by a symptoms framework whenever any TCP connections are set up in the background (e.g., for email checking, various push services, etc.) or by the user (e.g., web browsing or other applications invoked by the user). Based on the TCP connections that are set up and/or the success or failure of setting up TCP connections, these metrics may be generated and RTT may be calculated from the TCP segments.

In one embodiment these metrics may be particularly related to the backhaul of the WiFi connection, e.g., which may be used to generate an overall backhaul indication that may be used to determine whether the WiFi connection can be used for a real-time application, such as a voice call. In particular, this indication may provide the backhaul usability for a real time application and may be used to determine whether the WiFi or cellular (e.g., LTE) connection should be used as the data traffic bearer for the real-time application.

These metrics may include: connection attempts, connection successes, and/or round trip times (RTTs) or delays (e.g., such as minimum, maximum, and/or average RTTs), among other possible statistics. Using these metrics, the mobile device (e.g., the wireless radio manager of the mobile device) may create a map of ongoing TCP connections stats to determine the TCP performance over the WiFi connection.

For example, the mobile device may maintain the following data from the metrics:
1. PreConnAttempt: Previous Connection Attempts (TCP);
2. CurrentConnAttempt: Current Connection Attempts (TCP);
3. PrevConnSucc: Previous Connection Success (TCP);
4. CurrentConnSucc: Current Connection Success (TCP);
5. PrevinputPkts: Previous Input Packets (TCP); and/or
6. CurrentPacketsIn: Current Packets Received (TCP).

In one embodiment, this data may be generated from alternate sample of information sent by networking stack. Based on the data, a smart switching decision may be made and a BACKSTATUS indication may be evaluated, e.g., which may take into account some delta value for false alarms. In one embodiment, a BACKHAUL status of 1 may indicate that the WiFi connection may be used for any incoming/outgoing voice call request. Alternatively, a BACKHAUL status of 0 may indicate that the cellular connection (e.g., LTE) may be used for incoming/outgoing call request. In one embodiment, this selection may be coordinated with the carrier network as an IMS stack indication (e.g., by sending an IMS message to the carrier network).

In one embodiment, the decision to use a WiFi connection for a real-time application may involve some or all of the following processes.

The mobile device may determine whether to IMS register over an available WiFi connection. For example, the mobile device may monitor background TCP connection activity reported by the networking stack. For example, the mobile device may analyze periodic snapshot of TCP connections and then determine how many TCP connections are successful at each interval (e.g., using the data discussed above). In one embodiment, the mobile device may assume a WiFi connection is usable if at least one TCP connection attempt is successful out of 10 TCP connection attempts. According to this embodiment, if it determines 0 tcp connection attempts were successful, it may declare link is not usable. Similarly, the mobile device may determine a percent success rate of TCP connection attempts and may declare a WiFi connection usable if the success percentage crosses a threshold value. For example, if the success rate of connection attempts exceeds, e.g., 10%, the mobile device may assume that WiFi link is usable for iMS registration.

Note that this determination is exemplary only and other variations are envisioned. Additionally, or alternatively, the mobile device may take into account the uniqueness of the TCP connection attempts, e.g., to avoid the case where a Internet service is down and many of the failed TCP connection attempts relate to the failed service and is not reflective of a poor WiFi connection. Accordingly, the determination of the number or percent of successful attempts may be based on unique attempts.

In addition to real time statistics, historical information of WiFi connection(s) may be maintained, e.g., per SSID (service set identifier)+BSSID (basic service set identifier). Accordingly, the mobile device may allow IMS registration if the historical data indicates that the WiFi connection is generally usable.

When the mobile device is already IMS registered over WiFi, the mobile device may periodically check the health of the WiFi link to determine if idle mode handover is desired or not (e.g., from WiFi to cellular). In one embodiment, the mobile device may do this by checking that at least a few IP packets are being received from the network at a periodic interval, such as ePDG keep alive packets and/or IP packets from Internet, among other possibilities. IMS registration may be maintained if at least one IP packet is received successfully at each periodic interval.

Additionally, the mobile device may also need to determine whether to handover an active call from cellular to WiFi when user moves from cellular coverage to WiFi coverage. In this case, in one embodiment, in addition to TCP connection information and historical information discussed above, the mobile device may also check for minimum and average RTT of TCP connection. In one embodiment, minimum or average RTT of TCP connections over the WiFi connection must be better than 600 ms in order to allow handover of voice call from cellular to WiFi. If RTT is worse than 600 ms, the call may be maintained on the cellular connection. Note that the use of RTT thresholds may also be used for initial IMS registration and/or for maintaining IMS registration, if desired Thus, TCP connection statistics may be used as a valid indication as to how a backhaul (or more generally, a connection) is performing. For example, a TCP connection setup failure will surely indicate that the connection cannot support a real time application data flow, and accordingly, it makes sense to switch to a more reliable data traffic bearer for voice traffic, such as the LTE connection.

Quality of Service

In one embodiment, WiFi calling may be supported on any available WiFi connection, e.g., including home WiFi network, enterprise WiFi network, carrier supported WiFi network, etc. Enterprise and carrier supported WiFi networks might provide quality of service for WiFi calling. However, home networks might not have end-to-end quality of service in place. For example, for home networks, device to AP may generally have quality of service, but AP to carrier network link might not. In one embodiment, the mobile device may tag each VoIP or real-time application packet differently than other packets in order to give priority to the VoIP and/or real-time application packets. However, once such packets are received by the AP, there is no guarantee how quality of service will be maintained between the AP and the ePDG. Accordingly, in one embodiment, the AP may prioritize such packets for transmissions to the carrier's network. Once received, the carrier network may support prioritization of voice packets in carrier network. Similarly, when downlink packets are received from carrier network, the AP may prioritize VoIP packets over other packets in downlink to the mobile device.

Figure 7:
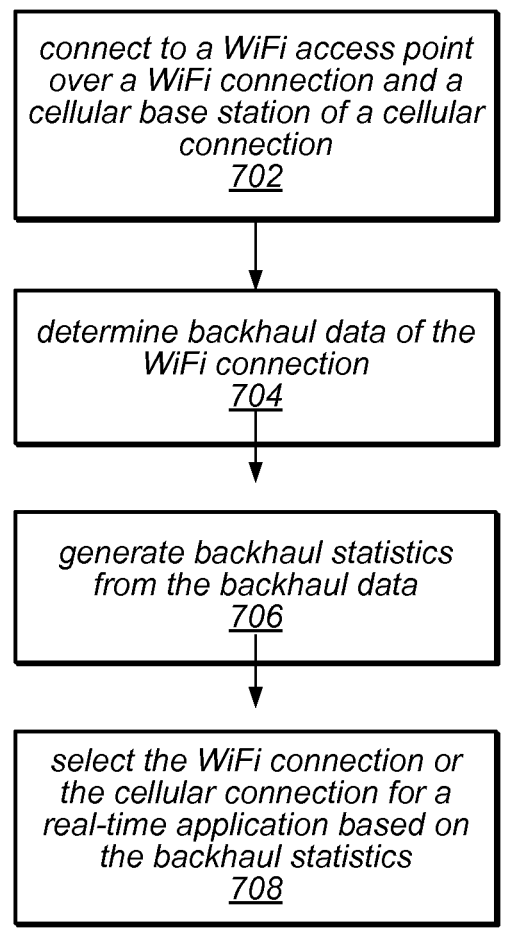
FIG. 7 is a flowchart diagram illustrating an exemplary method for performing data traffic bearer selection based on backhaul statistics according to one embodiment.

FIG. 7—Selecting a Data Traffic Bearer Based on Backhaul Statistics

FIG. 7 illustrates one embodiment of a method of selecting a data traffic bearer based on backhaul statistics. The method shown in FIG. 7 may be used in conjunction with any of the computer systems or devices shown in the above Figures, among other devices. For example, the method of FIG. 7 may be performed by mobile device 106. In various embodiments, some of the method elements shown may be performed concurrently, in a different order than shown, or may be omitted. Additional method elements may also be performed as desired. As shown, this method may operate as follows.

In 702, a mobile device may connect to an access point, e.g., a WiFi access point providing a WiFi network for connection to the Internet. Additionally, the mobile device may be connected to a cellular network, e.g., an LTE network.

In 704, the mobile device may determine backhaul data of the WiFi connection. For example, the mobile device may determine a current number of connection attempts (e.g., TCP connection attempts) and successes (e.g., TCP connection successes) made using the WiFi connection. These connection attempts and/or successes may be for non-real-time applications of the mobile device (e.g., of background services or other applications requested by the user). In one embodiment, the mobile device may specifically determine a current number of unique connection attempts and successes of those unique connection attempts, if desired. Additionally, or alternatively, the mobile device may determine a number of received IP packets, e.g., either in general or from one or more specific sources, as desired. Further, the mobile device may determine round trip times for one or more of the TCP connections.

704 may be performed in a periodic manner, e.g., every 5 seconds, although other intervals are envisioned. Additionally, or alternatively, 704 may be performed while the mobile device is in idle mode, e.g., using background or user requested data connections, e.g., that are not real-time applications. Alternatively, 704 may be performed while the mobile device is using a real-time application (such as a voice call) using an LTE connection. 704 may also be performed and applied to other situations, as desired.

In 706, the mobile device may generate one or more statistics from the backhaul data. For example, the mobile device may analyze the backhaul data (e.g., across periodic collections of the backhaul data) and generate statistics that may be used to characterize the quality of the WiFi connection.

For example, where the backhaul data is retrieved periodically, the mobile device may determine changes in various ones of the backhaul data that may be used to generate statistics. As a specific example, the backhaul data may include connection attempts and connection successes at each measurement, and 704 may include determining a change in connection attempts and connection successes. From this data, a percentage of successful connections may be determined using the two differences. Similarly, a number of received packets may be determined by subtracting data indicating received packets from the most recent period from the prior period.

Where RTT information is measured or reported, RTT statistics may be generated, e.g., minimum, maximum, average, etc.

In 708, the statistics may be used to determine whether to use a cellular connection or a WiFi connection for a real-time application. For example, the success percentage of WiFi connection attempts may be compared to a threshold, and if exceeded, the WiFi connection may be used. The determination of whether to use the WiFi connection may also include comparing the average, minimum, maximum, etc. RTT to a threshold, e.g., the RTT statistics falling below RTT threshold(s). Further, the determination may further include ensuring that data has been recently received (e.g., within a threshold period of time) using the WiFi connection (e.g., within the last period).

The method may further take into account historical information of the WiFi connection. For example, if the WiFi connection was previously determined to be viable (e.g., was used successfully or previously processed via the method of FIG. 7), it may be automatically determined to be usable. Alternatively, the historical information may bias the current decision making process (e.g., making the WiFi connection more easily used if it was previously determined to be usable). Other embodiments are envisioned for using historical information.

The method described above may be used at various times. For example, the method of FIG. 7 may be used while the mobile device is in idle mode (e.g., while not in a voice call and/or real-time application). In this case, the method may be used to determine whether to perform IMS registration of the WiFi connection, e.g., for a later real-time application. Alternatively, the method may be used while the mobile device is using a cellular connection for a real-time application (e.g., a voice call) to determine whether to handover the real-time application from cellular to WiFi (or vice versa). These two scenarios may use the statistics in different manners, e.g., there may be stricter thresholds are processes used for an active call versus while in idle mode. Alternatively, the same criteria and decision making processes may be used in either situation. Other situations are also envisioned.

Numbered Embodiments

The following numbered paragraphs describe exemplary implementations of the present embodiments.

1. A method for selecting a connection for a real time application, comprising: at a mobile device: communicating with a cellular network over a cellular connection; communicating with a WiFi network over a WiFi connection; determining backhaul data of the WiFi connection; generating a plurality of statistics from the backhaul data to generate backhaul statistics; based on the plurality of statistics passing one or more thresholds, selecting the WiFi connection for use in a real-time application of the mobile device.

2. The method of paragraph 1, wherein the real-time application comprises a voice call.

3. The method of any of paragraphs 1 or 2, wherein determining the backhaul data is performed based on one or more transmission control protocol (TCP) connections over the WiFi connection.

4. The method of paragraph 3, wherein the one or more TCP connections are for non-real-time applications.

5. The method of any of paragraphs 1-4, wherein said determining backhaul data of the WiFi connection, said generating the plurality of statistics, and said selecting the WiFi connection is performed while the mobile device is in idle mode.

6. The method of any of paragraphs 1-4, wherein said determining backhaul data of the WiFi connection, said generating the plurality of statistics, and said selecting the WiFi connection is performed while the mobile device uses the cellular connection for the real-time application, and wherein the method further comprises: performing handover of the real-time application from the cellular connection to the WiFi connection.

7. The method of any of paragraphs 1-6, wherein the backhaul statistics comprise round trip time statistics and wherein said selecting the WiFi connection is performed based on the round trip time statistics falling below one or more thresholds.

8. The method of any of paragraphs 1-7, wherein the backhaul data comprises connection attempts and connection successes, wherein the backhaul statistics comprise a percentage of connection successes from connection attempts, and wherein said selecting the WiFi connection is performed based on the percentage of connection successes from connection attempts exceeding a threshold.

9. The method of any of paragraphs 1-7, wherein the backhaul data comprises unique connection attempts and unique connection successes, wherein the backhaul statistics comprise a percentage of unique connection successes from unique connection attempts, and wherein said selecting the WiFi connection is performed based on the percentage of unique connection successes from unique connection attempts exceeding a threshold.

10. The method of any of paragraphs 1-9, wherein said determining backhaul data is performed periodically, wherein said generating a plurality of backhaul statistics is based on backhaul data from a plurality of periods.

11. The method of any of paragraphs 1-10, wherein said selecting the WiFi connection is performed based on receiving data within a threshold period of time.

12. A mobile device, comprising: at least one antenna; a first radio, wherein the first radio is configured to perform cellular communication with a cellular base station using at least one cellular radio access technology (RAT); a second radio, wherein the second radio is configured to perform Wi-Fi communication with a Wi-Fi access point; at least one processor coupled to the first and second radios, wherein the mobile device is configured to perform voice and/or data communications; wherein the mobile device is configured to: communicate with the cellular base station over a cellular connection; communicate with the WiFi access point over a WiFi connection; periodically determine backhaul data of the WiFi connection; generate a plurality of statistics from a plurality of backhaul data over at least two periods to generate backhaul statistics; based on the plurality of statistics passing one or more thresholds, select one of the WiFi connection and the cellular connection for performing a voice call.

13. The mobile device of paragraph 12, wherein periodically determining backhaul data of the WiFi connection, generating the plurality of statistics, and selecting one of the WiFi connection and the cellular connection is performed while the mobile device is in idle mode.

14. The mobile device of paragraph 12, wherein periodically determining backhaul data of the WiFi connection, generating the plurality of statistics, and selecting one of the WiFi connection and the cellular connection is performed while the mobile device uses the cellular connection for the voice call, wherein said selecting one of the WiFi connection and the cellular connection comprises selecting the WiFi connection, and wherein the mobile device is further configured to perform handover of the voice call from the cellular connection to the WiFi connection.

15. The mobile device of any of paragraphs 12-14, wherein the backhaul statistics comprise round trip time statistics and wherein selecting the WiFi connection is performed based on comparing the round trip time statistics to one or more thresholds.

16. The mobile device of any of paragraphs 12-15, wherein the backhaul data comprises connection attempts and connection successes, wherein the backhaul statistics comprise a percentage of connection successes from connection attempts.

17. The mobile device of any of paragraphs 12-16, wherein said selecting one of the WiFi connection and the cellular connection is performed based on receiving data via the WiFi connection within a threshold period of time.

18. A non-transitory, computer accessible memory medium storing program instructions for selecting a connection for a real time application, wherein the program instructions are executable by a processor of a mobile device to: communicate with a cellular network over a cellular connection and a WiFi network over a WiFi connection; generate a plurality of statistics based on backhaul data of the WiFi connection to generate backhaul statistics; based on the plurality of statistics passing one or more thresholds, select the WiFi connection for use in a voice call of the mobile device.

19. The non-transitory, computer accessible memory medium of paragraph 18, wherein generating the plurality of statistics and said selecting the WiFi connection is performed while the mobile device is in idle mode.

20. The non-transitory, computer accessible memory medium of paragraph 18, wherein generating the plurality of statistics and said selecting the WiFi connection is performed while the mobile device uses the cellular connection for the voice call, and wherein the program instructions are further executable to perform handover of the real-time application from the cellular connection to the WiFi connection.

21. A system for selecting a connection for a real time application, comprising: means for communicating with a cellular network over a cellular connection; means for communicating with a WiFi network over a WiFi connection; means for determining backhaul data of the WiFi connection; means for generating a plurality of statistics from the backhaul data to generate backhaul statistics; means for, based on the plurality of statistics passing one or more thresholds, selecting the WiFi connection for use in a real-time application of the mobile device.

22. A method as substantially described herein with reference to each or any combination of FIG. 1 through FIG. 7 or with reference to each or any combination of paragraphs in the Detailed Description.

23. A device as substantially described herein with reference to each or any combination of FIG. 1 through FIG. 7 or with reference to each or any combination of paragraphs in the Detailed Description.

24. A system as substantially described herein with reference to each or any combination of FIG. 1 through FIG. 7 or with reference to each or any combination of paragraphs in the Detailed Description.

25. A non-transitory, computer accessible memory medium storing program instructions executable to perform embodiments as substantially described herein with reference to each or any combination of FIG. 1 through FIG. 7 or with reference to each or any combination of paragraphs in the Detailed Description.

Embodiments of the present application may be realized in any of various forms. For example, various described embodiments may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs. For example, some or all of the units included in the UE may be implemented as ASICs, FPGAs, or any other suitable hardware components or modules.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for selecting a connection for a real time application, comprising:
   at a mobile device:
      communicating with a cellular network over a cellular connection;
      communicating with a WiFi network over a WiFi connection;
      determining backhaul data of the WiFi connection, wherein the backhaul data comprises unique connection attempts and unique connection successes using the WiFi connection;
      generating a plurality of backhaul statistics from the backhaul data, wherein the backhaul statistics comprise a percentage of unique connection successes from unique connection attempts of the WiFi connection;
      based on the plurality of backhaul statistics passing a threshold specifying a percentage of successful connection attempts, selecting the WiFi connection for use in a real-time application of the mobile device, wherein said selecting the WiFi connection is performed based on the percentage of unique connection successes from unique connection attempts of the WiFi connection exceeding the threshold.

2. The method of claim 1, wherein the real-time application comprises a voice call.

3. The method of claim 1, wherein determining the backhaul data is performed based on one or more transmission control protocol (TCP) connections over the WiFi connection.

4. The method of claim 3, wherein the one or more TCP connections are for non-real-time applications.

5. The method of claim 1, wherein said determining backhaul data of the WiFi connection, said generating the plurality of backhaul statistics, and said selecting the WiFi connection is performed while the mobile device is in idle mode.

6. The method of claim 1, wherein said determining backhaul data of the WiFi connection, said generating the plurality of backhaul statistics, and said selecting the WiFi connection is performed while the mobile device uses the cellular connection for the real-time application, and wherein the method further comprises:
   performing handover of the real-time application from the cellular connection to the WiFi connection.

7. The method of claim 1, wherein the backhaul statistics comprise round trip time statistics and wherein said selecting the WiFi connection is performed based on the round trip time statistics falling below the threshold.

8. The method of claim 1, wherein said determining backhaul data is performed periodically, wherein said generating a plurality of backhaul statistics is based on backhaul data from a plurality of periods.

9. The method of claim 1, wherein said selecting the WiFi connection is performed based on receiving data within a threshold period of time.

10. A mobile device, comprising:
    at least one antenna;
    a first radio, wherein the first radio is configured to perform cellular communication with a cellular base station using at least one cellular radio access technology (RAT);
    a second radio, wherein the second radio is configured to perform Wi-Fi communication with a Wi-Fi access point;
    at least one processor coupled to the first and second radios, wherein the mobile device is configured to perform voice and/or data communications;
    wherein the mobile device is configured to:
       communicate with the cellular base station over a cellular connection;
       communicate with the WiFi access point over a WiFi connection;
       periodically determine backhaul data of the WiFi connection, wherein the backhaul data comprises unique connection attempts and unique connection successes using the WiFi connection;
       generate a plurality of backhaul statistics from a plurality of backhaul data over at least two periods, wherein the backhaul statistics comprise a percentage of unique connection successes from unique connection attempts of the WiFi connection;
       based on the plurality of statistics passing a threshold specifying a percentage of successful connection attempts, select one of the WiFi connection and the cellular connection for performing a voice call, wherein said selecting one of the WiFi connection and the cellular connection is performed based on the percentage of unique connection successes from unique connection attempts of the WiFi connection passing the threshold.

11. The mobile device of claim 10, wherein periodically determining backhaul data of the WiFi connection, generating the plurality of backhaul statistics, and selecting one of the WiFi connection and the cellular connection is performed while the mobile device is in idle mode.

12. The mobile device of claim 10, wherein periodically determining backhaul data of the WiFi connection, generating the plurality of backhaul statistics, and selecting one of the WiFi connection and the cellular connection is performed while the mobile device uses the cellular connection for the voice call, wherein said selecting one of the WiFi connection and the cellular connection comprises selecting the WiFi connection, and wherein the mobile device is further configured to perform handover of the voice call from the cellular connection to the WiFi connection.

13. The mobile device of claim 10, wherein the backhaul statistics comprise round trip time statistics and wherein selecting the WiFi connection is performed based on comparing the round trip time statistics to one or more thresholds.

14. The mobile device of claim 10, wherein said selecting one of the WiFi connection and the cellular connection is performed based on receiving data via the WiFi connection within a threshold period of time.

15. A non-transitory, computer accessible memory medium storing program instructions for selecting a connection for a real time application, wherein the program instructions are executable by a processor of a mobile device to:
- communicate with a cellular network over a cellular connection and a WiFi network over a WiFi connection;
- generate a plurality of backhaul statistics based on backhaul data of the WiFi connection, wherein the backhaul statistics comprise a percentage of unique connection successes from unique connection attempts using the WiFi connection;
- based on the plurality of backhaul statistics passing a threshold specifying a percentage of successful connection attempts, select the WiFi connection for use in a voice call of the mobile device, wherein said selecting the WiFi connection is performed based on the percentage of unique connection successes from unique connection attempts of the WiFi connection exceeding the threshold.

16. The non-transitory, computer accessible memory medium of claim 15, wherein generating the plurality of backhaul statistics and said selecting the WiFi connection is performed while the mobile device is in idle mode.

17. The non-transitory, computer accessible memory medium of claim 15, wherein generating the plurality of backhaul statistics and said selecting the WiFi connection is performed while the mobile device uses the cellular connection for the voice call, and wherein the program instructions are further executable to perform handover of the real-time application from the cellular connection to the WiFi connection.

18. The non-transitory, computer accessible memory medium of claim 15, wherein the real-time application comprises a voice call.

19. The non-transitory, computer accessible memory medium of claim 15, wherein said determining backhaul data of the WiFi connection, said generating the plurality of backhaul statistics, and said selecting the WiFi connection is performed while the mobile device is in idle mode.

20. The non-transitory, computer accessible memory medium of claim 15, wherein said determining backhaul data of the WiFi connection, said generating the plurality of backhaul statistics, and said selecting the WiFi connection is performed while the mobile device uses the cellular connection for the real-time application, and wherein the program instructions are further executable to:
- perform handover of the real-time application from the cellular connection to the WiFi connection.

* * * * *